R. E. THOMPSON.
RADIORECEIVING APPARATUS.
APPLICATION FILED AUG. 21, 1917.
1,328,933.
Patented Jan. 27, 1920.
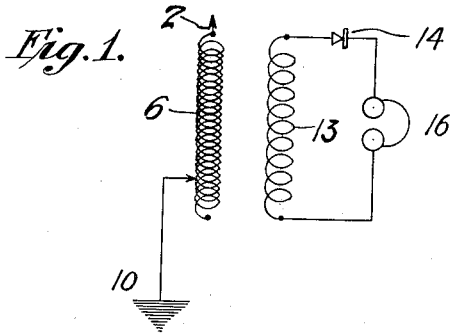
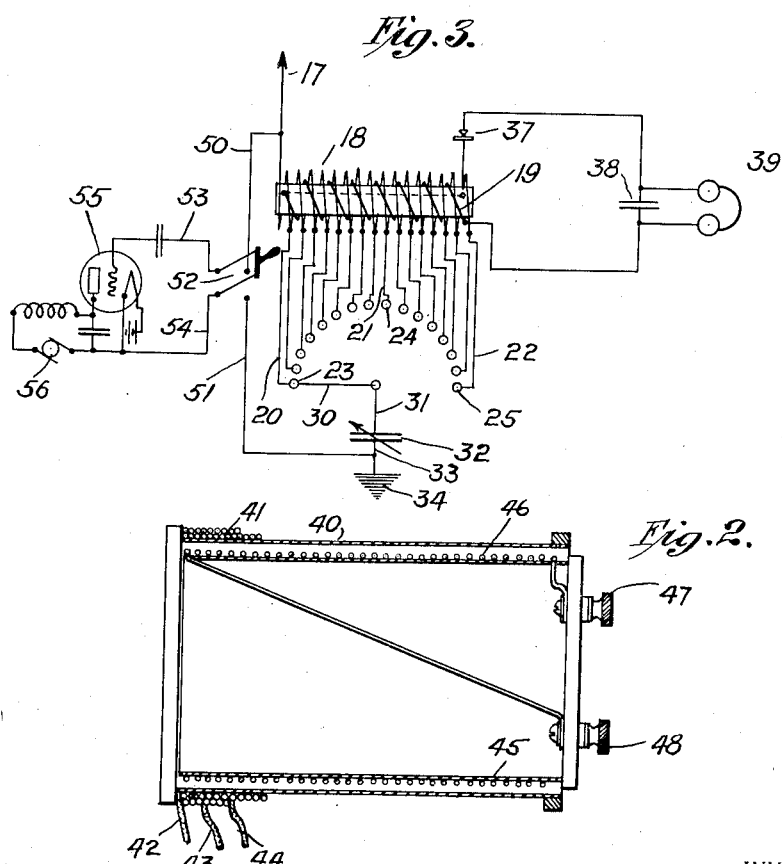
WITNESSES:
INVENTOR.
Roy E. Thompson
by his attorney
Philip Farnsworth

UNITED STATES PATENT OFFICE.

ROY E. THOMPSON, OF NEW YORK, N. Y.

RADIORECEIVING APPARATUS.

1,328,933.   Specification of Letters Patent.   Patented Jan. 27, 1920.

Application filed August 21, 1917. Serial No. 187,347.

*To all whom it may concern:*

Be it known that I, ROY E. THOMPSON, a citizen of the United States, and a resident of New York city, county of New York, State of New York, have invented certain new and useful Improvements in Radioreceiving Apparatus, of which the following is a specification.

This invention relates to radio receiving apparatus.

Its objects, among others, are increased efficiency and simplicity of operation.

The invention consists of certain novel constructional features of the utilization circuit which usually contains the detector, together with certain means for associating said circuit with an exciting circuit, as hereinafter described, all pursuant to discoveries made by me in extensive investigations of the radio receiving problem.

The invention employs various features of circuit connections which are old in the radio art, and the useful novelty resides chiefly in the construction of the apparatus included in the detector circuit, and especially in the proper association of this novel construction with the receiving antenna or exciting circuit.

Figure 1 is a diagram of a circuit connection which may be employed within the invention, as to which diagrammatically, there is nothing novel.

Fig. 2 is a vertical section of a form of construction which may be used within the invention, of the energy transformer, and particularly, of the secondary or detector coil when two coils are used; and Fig. 3 is a diagram, drawn in greater detail than that of Fig. 1, and containing at the left an added feature which may be employed usefully in combination with the main feature of the invention.

In Fig. 1 the antenna is 2, 6, 10 and the detector circuit is 13, 14, 16. The antenna includes tuning inductance 6 connected to earth 10 via an adjustable connection indicated by arrow, and connected at the top via 2 to any suitable aerial structure. Of the detector circuit or circuit of utilization, 13 is the secondary coil, 14 any suitable detector and 16 the indicator or telephone, the detector and telephone constituting the complete indicating apparatus. The word "detector" is employed herein in its ordinary sense as being a device which directly or indirectly serves to cause the receipt of radio frequency signals to cause the operation of a suitable indicating device, such as a telephone.

I have discovered that in the use of two circuits at a radio receiving station, closely coupled together, a transfer of energy from the first to the second and its utilization in useful work in the second, can be effected equally well at any period of the first circuit and wholly independently of the period of the second circuit, provided that the second circuit be constructed as described later.

Heretofore at radio receiving stations it has been customary to employ two circuits supplying the detector and telephone, these two circuits being termed the antenna circuit and the secondary circuit, and heretofore the most efficient use of the received energy has been obtained when both said circuits were made resonant, and both adjusted to have the same or substantially the same time-period. The utility of this two-tuned-circuit arrangement was due to the facts that the secondary circuit not only received energy from the antenna, but being a resonant circuit, it permitted that energy to accumulate to the maximum and thereby efficiently operate the indicating apparatus, such as a detector and telephone, or in some cases, a telephone alone. This secondary circuit, also having the same time-period as its primary circuit, thereby permitted the two circuits to resonate harmoniously with consequent beneficial results, as is well-known.

This coupled-tuned circuit receiving apparatus (known as the Marconi type) proved so exceedingly useful in radio work that for many years it was not deemed possible to devise practical apparatus which was not of this type.

However, notwithstanding that this type was standard practice for many years, the art recognized that it possessed certain serious disadvantages. Attempts were made to improve the type so as to eliminate these disadvantages, but the latter proved to be inherent in the type. The chief disadvantages were two—first, the inconvenience and delay involved in making fine adjustments in order to operate at best efficiency, and second, the inefficiency of operation due to coupling difficulties incidental to the transfer of energy from the antenna to the secondary circuit.

In my invention, all adjustments may be dispensed with save that of the antenna, and all of said coupling difficulties are eliminated.

The first disadvantage in the coupled-tuned circuit type was involved in the manipulative adjustments executed by the receiving operator. Each of the two circuits contained at least one frequency-determining element, as a variable coil or a condenser, and generally both of such elements, and such elements in both circuits, were required to be accurately adjusted, in order to obtain the efficiency of the type, each time that a message at a different wave-length came in from a distant transmitter. In fact, the highest efficiency of which this type was capable could not be obtained unless the operator first by trial adjustments put the two circuits into the same tune. This usually involved first, an adjustment of the antenna circuit; then an adjustment of the secondary circuit; then a re-adjustment of the antenna circuit; then a re-adjustment of the secondary circuit, etc., sometimes including an adjustment of two or more elements in each circuit, so that, at best, it took a substantial length of time to put the apparatus into best condition. All this was a very serious disadvantage in practice, on account of the great importance of quick service. But this disadvantage was borne with, because it was inseparable from the efficiency of this type.

In my invention, there is equal efficiency with the coupled-tuned-circuit type, without requirement of any adjustments of a secondary circuit.

The second disadvantage in the coupled-tuned-circuit type involved difficulties in the coupling between the two resonant circuits. If this coupling were too close, some of the energy accumulating and persistently oscillating in the secondary, was transferred back to the antenna, and re-radiated and wasted, instead of going forward to do useful work on the indicating apparatus,—for the very fact that harmonious persistent oscillation of the two circuits facilitated the transfer of energy from primary to secondary, likewise facilitated the re-transfer of energy back from secondary to primary. On the other hand, if the coupling were then loosened in order to prevent such re-transfer, then that resulted in a decrease of the efficiency of energy-transfer from the antenna to the secondary. In practice a compromise was made by having the coupling neither very close nor very loose, i. e., not so close as to cause a re-transfer of considerable energy back to the antenna, and not so loose as to prevent the transfer of a substantial amount of energy from antenna to secondary. This, however, did not remove, but merely alleviated, the difficulty, and there yet remained a substantial loss of efficiency because the compromise coupling was not close enough to transfer to the secondary all the energy supplied to the receiving antenna.

In my invention there are no coupling difficulties because I eliminate entirely the accumulative action of the circuit supplied from the antenna, so that instead of a re-transfer of energy back to the antenna, the entire energy, transferred to the utilization circuit, is instantly consumed therein in doing useful work in operating the indicating apparatus.

In the best form of the coupled-tuned-circuit type, the secondary circuit included the secondary coil of an oscillation transformer, and a condenser, in series with each other, and said condenser was in shunt or parallel between the detector and the secondary coil, the coil and condenser constituting a resonant cumulative circuit, this condenser being preferably variable to adjust the period of the secondary to that of the antenna; or else the inductance in the secondary was variable; or both the condenser and inductance in the secondary were variable, in order to obtain the best tuning.

In other forms of this coupled-tuned-circuit type, in order to reduce the manipulative operations of the receiving operator, such condenser has been omitted, and then the secondary coil was the only adjustable element in the secondary circuit. (Of course, in all cases, the antenna is adjusted to be put in tune with the received waves.)

In yet other forms of this type, no adjustment has been provided for the secondary circuit, but it has been given a fixed period approximating the range of commercial frequencies received on the antenna (no variability being provided for any reactance in the secondary circuit), the idea having been to eliminate all the troublesome secondary adjustments, but yet to retain the advantage of having the secondary more or less closely or broadly tuned to the antenna. This form has been termed the non-adjustable or "untuned" form, although the fact is that the secondary did have a "tune," as various investigators have shown. The difficulty with such attempted simplified form, however, was that the efficiency was reduced in proportion as the fixed period of the secondary was different from that of received signals to which the antenna was tuned. That is, although such a modified receiving set of the coupled-tuned-circuit type might be very efficient when the incoming waves had a period which happened to be the same or nearly the same as the fixed period of the secondary, yet the efficiency for receiving wave-lengths higher or lower than the period of the secondary, was proportionately less, and the efficiency fell off rapidly for increases of difference in periods of secondary and received waves.

As to the coupling troubles, constituting the second disadvantage of the coupled-tuned-circuit type, no form of apparatus has been devised to overcome this, prior to my invention.

The invention herein is based upon the discovery, made by me, that the inefficiency of said non-adjustable (so-called "untuned") secondaries was due to the presence of distributed capacity yet existing in the circuit, even in cases where no condenser (lumped capacity) was used in shunt to the detector and coil. I discovered that this distributed capacity was acting to make the circuit cumulative to a substantial degree. In other words, what I discovered was that when it was attempted to simplify the operation by omitting an adjustable condenser paralleling the detector (in addition to the omission of adjustable inductance), such omission alone did not make the secondary circuit a non-resonant circuit, but simply deprived it of the mechanical advantage of being adjusted to have identically the same period as that to which the antenna was adjusted. It possessed the disadvantages of a condition of resonance in the secondary without the ability to take advantage thereof. It therefore was nothing else than an inferior form of the coupled-tuned-circuit type, nothwithstanding that this modification has been termed as "untuned secondary" type by many writers simply because no adjustable condenser for exact tuning was provided in the secondary. The secondary was in fact tuned, although not to the exactitude required for the highest efficiency of the type.

In the practice of making secondary circuits without a condenser in parallel to the detector and secondary coil, it has been assumed, apparently, that the omission of this condenser removed from the circuit all capacity which was acting to make it a tuned cumulative circuit. The fact apparently has been overlooked that the circuit always possessed substantial capacity other than that of the omitted condenser (especially that capacity which is resident in the secondary coil).

I have found that the reason why the so-called "untuned", i. e., non-adjustable secondary, did not respond efficiently to the various wave-lengths, was the existence of such distributed capacity. This distributed capacity of the coil provided it with ability to accumulate enough energy to be effective in re-acting on the driving circuit to such a degree as to make necessary the adjustment to the same period in order to eliminate such re-action effect.

I have demonstrated that if the secondary circuit be constructed to have so little capacity (in parallel to the detector and secondary coil) as to be substantially non-effective in making the secondary a tuned circuit, then it is possible to operate a receiving station at maximum efficiency for all possible periods of transmitted waves, without any reactance adjustments of the secondary whatsoever. What I demonstrated, precisely, was that a detector circuit, or circuit of utilization, in order to be truly untimed or aperiodic, must not possess sufficient capacity to accumulate energy so as to react on subsequent impulses so as to decrease the efficiency of operation.

Under practical conditions, and with such minimum capacity in the secondary as the fundamental condition for substantial aperiodicity of the secondary, I have obtained in the following manner the same efficiency of reception at all present commercial wave lengths, without any adjustment whatsoever of the secondary circuit. The coupling between the antenna and the utilization circuit should be sufficiently close to cause an instantaneous and complete transfer of energy from the antenna, and thereby cause the creation of maximum potential in the utilization circuit, without any necessity for, (or any actual,) substantial accumulation of energy, as in the coupled-tuned-circuit type; yet without any substantial loss of energy, and without any substantial re-transfer of energy back from the detector circuit to the antenna. This instantaneous maximum potential is created across the detector, and the resulting effect is passed directly, via the detector, to the telephone, or amplifier and telephone, or whatever constitutes the rest of the indicating apparatus. Under these circumstances, the utilization circuit being actually aperiodic, and no energy being accumulated therein, there is none of the coupling troubles which existed in the coupled-tuned-circuit type, for there is no re-transfer of energy back from the utilization circuit to the antenna, all the energy which was instantaneously transferred from antenna to utilization circuit being instantly employed in causing or controlling the indication of the signal. In all cases the non-adjustable utilization circuit has the same efficiency, irrespective of the frequency of the transmitted waves. All this is particularly true when the natural period of the aperiodic non-accumulative utilization circuit is far below 300 meters, (the latter being the shortest commercially used wave length), and when the antenna is adjusted substantially above 300 meters (the lowest wave length now employed commercially).

In brief, the construction is such that substantially all of the energy received on the antenna is instantly passed on to its place of utilization without any interval of accumulation in the utilization circuit.

In usefully employing my discovery, I reduce the capacity deleteriously effective in parallel between the detector and secondary coil, in either or both of two ways. First, I reduce, so far as practical or desirable, the distributed capacity of the coil itself, for in so far as that is allowed to exist, it is effective in parallel to the coil and detector, and effective deleteriously as stated above. This reduction may be effected in any well-known way of constructing any coil to be without substantial distributed capacity. Second, I locate the detector in the circuit so that any capacity which may exist anywhere in the circuit, including any distributed capacity remaining in the coil, is in series with the detector and not in parallel thereto. For example, I locate the detector as near as practicable to an end of the secondary coil, as is indicated in Fig. 1, where detector 14 is shown, in diagram, as being near the end of coil 13, and may be connected directly to the end of the coil. This reduces the capacity of the lead between coil and detector, thereby reducing the amount of capacity effective in parallel between coil and detector. Of course, in practice, the detector will be connected as near the end of the coil (depending on the condition of distributed capacity in the coil) as will secure the desired result of maximum efficiency at all wave-lengths without adjustment of capacity or inductance in the utilization circuit.

In Fig. 2 is shown a coil of the utilization circuit, especially adapted for an antenna coil of a given range of wave-lengths, i. e. in this example 100 to 3600 meters.

For a receiver the antenna or primary of which is to have a range of from 100 to 3600 meters when connected to an average ship's antenna, the following dimensions are suitable to embody my invention. Around a primary core 40 (Fig. 2) of suitable insulating material, four inches in diameter and seven inches long, is wound a primary coil consisting of 280 turns of wire, 41, having a diameter over the insulation of approximately .05 inch. This primary winding is in two layers, and may be "banked" in acordance with the well-known method of winding coils for the elimination of layer capacity, in order to permit only a single frequency in the antenna for any given adjustment; but my invention otherwise is entirely operative without such banking. Suitable tape 42—43—44, etc., may be taken off, as desired, for purposes of adjustment of period of the antenna. Provided with means for sliding all the way inside of the primary core 40 is the secondary cylinder 45 which is 3½ inches in diameter and 7 inches long. Around this cylinder is wound a single-layer secondary coil consisting of 70 turns of conductor 46 of a diameter, outside the insulation, of .05 inch, each turn being separated from each adjacent turn by .05 of an inch and .1 inch being left between centers of these turns. The conductor I have used for this is a cable consisting of 72 strands of No. 38 wire, enameled and the entire cable being covered with the usual commercial silk insulation. The extreme ends of the winding 46 are connected to binding posts 47 and 48 to which, in turn, are connected the detector 14 and telephone 16 of Fig. 1.

The peculiarity of Fig. 2, which is typical of embodiments of my invention in coils for any range of wave-lengths, is that the utilization circuit has high inductance, without the capacity normally corresponding thereto. The secondary coil is preferably of the same length as the primary coil (or the secondary is at least as long as the primary); the two coils have as nearly as practicable the same diameter, and the secondary coil has sufficient inductance (at such length and diameter) to provide a coupling as close, in theory, as approximately 38%. Yet the capacity of the secondary coil is reduced, first, by providing all the inductance in a single layer; second, by separating the turns from each other; third, by limiting the total number of turns. Hence, in order to provide adequate inductance, the tendency is toward a secondary coil of large diameter, or considerable length, or both. In any case (of different wave-length ranges) the total number of turns is limited so as not to provide too great capacity. The single layer of winding is the second in importance of the above three items. If a less range than up to 3600 meters be used, the turns need not be separated from each other, and also, if a still shorter range be used, the winding need not be in a single layer. For a range up to 3600 meters the items specified for Fig. 2 are vastly preferable, and for longer ranges are absolutely necessary. In any case, in order to obtain the desired close coupling, the two coils are preferably similar to each other in respect of their lengths and also of their diameters.

Although I prefer the two-coil type of coupling shown, yet an autotransformer or single-coil coupling may be employed with my invention, which is not concerned with the coupling save in the matters of sufficiently low deleterious capacity, and of sufficiently great inductance to permit full transfer of energy. The term "inductance coupling" is used herein to define any form of coupling by means of inductance. In the case of an autotransformer coupling, the antenna-adjustment of the single coil has no effect on the aperiodic circuit of utilization.

An object of my invention is the maximum efficiency in respect of energy-transfer, with the minimum of manipulative adjustments. This object is substantially attained in the apparatus of Figs. 1 and 2, but is present in an even higher degree in the apparatus of Fig. 3, which includes the utilization circuit of Figs. 1 and 2 together with certain additions.

In Fig. 3, 17 designates an antenna corresponding to the antenna 4 of Fig. 1, which is connected to one terminal of the primary coil 18 of a coupling transformer of such helical form that the secondary coil 19 may be slidably inserted within coil 18 and withdrawn therefrom to place any desired portion of the whole length of said secondary coil 19 in a concentric position within said primary coil 18, so as to effect any desired degree of inductive relation therebetween.

The other terminal of the primary coil 18 and the successive turns thereof, are each connected by leads (as 20, 21, 22) to switch-contact points (as 23, 24, 25) which are disposed in the path of a switch-contact arm 30 which may be swingingly moved to engage with any desired one of said contact points 23, 24, 25, said arm 30 being connected by a conductor 31 to one terminal of a variable condenser 32, the other terminal of which is connected by a conductor 33 with the earth 34.

The turns of the secondary coil 19 are disposed in only one layer at a distance apart, as in Fig. 2, and the external diameter of coil 19 preferably is almost as great as the internal diameter of the primary coil 18, so that these two coils are in close proximity to each other.

One terminal of the secondary coil 19 of Fig. 3 is connected to one terminal of detector 37, the other terminal of which may be connected to one side of a condenser 38, the other side of which is connected to the other terminal of the secondary coil 19. Connected with the opposite sides of the condenser 38 are the terminals of a head telephone receiver 39.

The detector 37, as in Fig. 1, may be disposed in its circuit as near as it is physically practicable to the secondary coil 19 so as to remove as much as possible of the capacity of the secondary leads. The condenser 38 may be omitted, as in Fig. 1, to simplify the apparatus, since it is not essential for a realization of the purpose of my invention. It may be used consistently with the invention, however, because it does not constitute a capacity effective in parallel between the coupling coil and detector as would be the case of a condenser connected across the terminals of the coil.

The wires 50 and 51 connect to the antenna and ground 34 respectively and are adapted to be connected by the switch 50 and the leads 53—54 with the high frequency oscillation-generator 55 which generator may be as shown (an oscillating audion of the well-known type), or it may be any other form of generator for causing continuous oscillations of radio frequency in the antenna. By this arrangement, without varying the constants of any circuit other than the antenna itself (i. e., coil 18), I cause waves of the frequency of the period of the antenna to be continually impressed on the secondary coil 19. This results in direct continuous current flowing through the telephones 39. If now waves of a slightly different frequency arrive from a distant sending station, beats due to the difference between the two frequencies will be set up, and the direct current through the telephones 39 will be caused to undulate at a rate equal to the number of beats produced per second by the two frequencies, and these undulations will cause a movement of the telephone diaphragm resulting in sound of a pitch equal to the beat-frequency.

The advantage of this arrangement is that by simply varying the period of the antenna, the beat-frequency is also varied; and this, together with the novel utilization circuit of my invention, permits the maximum of efficiency to be obtained with a minimum of adjustments or circuit variations.

I am aware of the fact that it is well known in the electrical art in general that distributed capacity in coils is undesirable. Many writers have mentioned the desirability of eliminating distributed capacity of coils wherever the coils are to be used, for the reason that a coil possessing this distributed capacity will have local frequencies set up in it. But I believe that I am the first to discover that a coil having no effective capacity, but at the same time, inductance sufficiently great to couple very closely to a second coil, will respond without any adjustment of its circuit to all frequencies which may be present in such second coil, as efficiently (or more so) as if capacity be added in the proper amount to the first coil to time it exactly to the second coil or circuit by making the product of its capacity and inductance the same as the product of the capacity and inductance of such other coil or circuit.

The features constituting a practical embodiment of my invention are (1) a circuit of utilization lacking capacity effective in causing accumulation of received energy; (2) any suitable main receiving circuit or antenna capable of being tuned to transmitted waves; (3) a sufficiently close coupling of antenna and circuit of utilization to cause an instantaneous transfer of the energy from the antenna, thereby creating a maximum potential in the circuit of utilization without substantial accumulation therein; (4) any suitable indicating apparatus capable of promptly consuming the transferred energy, thereby also reducing any tendency to persistence of the energy in the circuit of utilization and any tendency to re-transfer energy back to the antenna. In such apparatus, the transfer and utilization of energy is just as efficient when the circuit of utilization is a thousand per cent. out of syntony with the antenna as it is in a case of absolute syntony with the antenna.

The expressions herein "but little capacity," "substantially no capacity," and the like, mean that the capacity present, if any, is so slight that it does not prevent substantially maximum or equal efficiency at all wave-lengths over which the antenna is designed to operate without any reactance adjustments of the utilization circuit. Hence the criterion of the presence of the invention, and of the amount of capacity corresponding to the invention, is such substantially uniform efficiency of operation over such wave-length ranges.

In addition to the other advantages of my invention, the apparatus embodying it possesses greater selectivity, with maximum efficiency, than any apparatus known heretofore; this being due to the fact that the utilization circuit cannot react on the antenna, due to the construction of the utilization circuit and notwithstanding its closeness of coupling to the antenna, and thus is prevented any impairment of the most perfect freedom of oscillation of the antenna.

I claim:

1. In radio receiving apparatus, the combination with an antenna, of a circuit of utilization, a primary coupling-coil in the antenna having a banked winding, and a secondary coupling-coil consisting of a single layer of turns of conductor separated from each other, said circuit of utilization including said secondary coil and having substantially no capacity effective in parallel with said coil.

2. In radio receiving apparatus, the combination with an antenna, of a circuit of utilization, and a coupling-coil consisting of a single layer of turns of conductor separated from each other, said utilization circuit including said coil and having substantially no capacity effective in accumulating received energy.

3. In radio receiving apparatus, the combination with an antenna, of a circuit of utilization, and an inductance coupling, said utilization circuit having substantially no capacity effective in accumulating received energy, but containing sufficient inductance to cause efficient transfer of energy from the antenna to the place of utilization.

4. In radio receiving apparatus, the combination with a receiving antenna, of a circuit of utilization, and an inductance coupling, the part of said coupling in said utilization circuit being constructed to have substantially no capacity effective in accumulating received energy in said utilization circuit, whereby uniform efficiency of reception is maintained over a range of various wave-lengths without adjustment of the period of the utilization circuit.

5. In radio receiving apparatus, the combination with a receiving antenna, of a circuit of utilization coupled thereto and constructed to have substantially no capacity effective in accumulating received energy therein, whereby uniform efficiency of reception is maintained over a range of various wave-lengths without adjustment of time period of the circuit of utilization.

6. In radio receiving apparatus, the combination with a receiving antenna, of a circuit of utilization, an inductance coupling the part of which in said utilization circuit is constructed to have substantially no capacity in parallel with the coil, and a detector connected by a short lead to the coupling inductance in the utilization circuit.

7. In radio receiving apparatus, the combination with an antenna, of a circuit of utilization containing a detector and coupling inductance, said circuit being constructed without a substantial amount of distributed capacity effective in parallel with the coupling inductance and detector.

8. In radio receiving apparatus, the combination with a receiving antenna, of indicating apparatus, and a utilization circuit containing substantially no distributed capacity, and closely coupled to the antenna, whereby energy is transferred directly from the antenna to the indicating apparatus without intermediary accumulation.

9. In radio receiving apparatus, the combination with a receiving antenna, of indicating apparatus, and a substantially non-cumulative circuit of utilization adapted to be closely coupled to the antenna, thereby causing the transfer of energy from the antenna directly to cause the operation of the indicating apparatus, without intermediary accumulation of energy in the circuit of utilization.

10. In radio receiving apparatus, the combination with a receiving antenna, of a variable frequency-determining element connected therein; an inductance coupling including said element, a circuit of utilization connected to the coupling but having substantially no distributed capacity effective in accumulating energy in said utilization circuit; and another circuit including said variable frequency-determining element and supplied by a local source of radio-frequency oscillations located at the receiving station.

11. In radio receiving apparatus, the combination with an antenna, of a utilization circuit, and an inductance coupling consisting of two coils of substantially equal length in mutually inductive relation, the secondary coil comprising a single layer of turns of insulated conductor, said insulated turns being separated from each other in space; said utilization circuit including said secondary coil and having substantially no capacity effective in accumulating received energy.

12. In radio receiving apparatus, the combination with an antenna provided with a frequency-determining element whereby the antenna may be tuned to wave-length as high as substantially above three hundred meters, of a non-cumulative utilization circuit having a fixed period of substantially less than three hundred meters.

ROY E. THOMPSON.